United States Patent [19]
Nakanishi et al.

[11] Patent Number: 6,163,349
[45] Date of Patent: Dec. 19, 2000

[54] PROJECTION-TYPE COLOR LIQUID CRYSTAL DISPLAY DEVICE HAVING NON OVERLAPPING PIXEL IMAGES

[75] Inventors: Hiroshi Nakanishi, Sakurai; Hiroshi Hamada, Nara, both of Japan

[73] Assignee: Sharp Kabushiki Kaisha, Osaka, Japan

[21] Appl. No.: 08/870,292

[22] Filed: Jun. 6, 1997

[30] Foreign Application Priority Data

Jun. 18, 1996 [JP] Japan ................................. 8-157168

[51] Int. Cl.⁷ ................. G02F 1/1335; G03B 21/00; G03B 21/14
[52] U.S. Cl. ................. 349/5; 349/95; 353/31; 353/38
[58] Field of Search .................... 349/5, 6, 114, 349/95, 106; 353/31, 38, 84

[56] References Cited

U.S. PATENT DOCUMENTS

| | | | |
|---|---|---|---|
| 5,056,912 | 10/1991 | Haada et al. | 353/38 |
| 5,126,863 | 6/1992 | Otsuka et al. | 359/41 |
| 5,187,599 | 2/1993 | Nakanishi et al. | 359/41 |
| 5,623,348 | 4/1997 | Ogino | 349/5 |
| 5,633,737 | 5/1997 | Tanaka et al. | 349/95 |
| 5,760,849 | 6/1998 | Omae et al. | 349/5 |

FOREIGN PATENT DOCUMENTS

| | | |
|---|---|---|
| 0 465 171 | 1/1992 | European Pat. Off. . |
| 4-60538 | 2/1992 | Japan . |
| 7-181487 | 7/1995 | Japan . |
| WO 96 02112 | 1/1996 | WIPO . |
| WO 96 02113 | 1/1996 | WIPO . |
| WO 96 12373 | 4/1996 | WIPO . |

*Primary Examiner*—Walter Malinowski
*Attorney, Agent, or Firm*—Nixon & Vanderhye P.C.

[57] ABSTRACT

A microlens array is provided on a light-outgoing side of a monochromic LCD element having a plurality of pixels each corresponding to any one of the three colors R, G, and B. Microlenses of the microlens array respectively correspond to pixel groups each of which is composed of three pixels corresponding to the three colors R, G, and B, respectively. Light fluxes having passed through the microlens array are converged at an entrance pupil position of a projection lens by a field lens and form pixel enlarged images corresponding to the colors R, G, and B. At the entrance pupil position, there is provided a color filter having color regions which respectively correspond to the colors to which the pixel enlarged images correspond. With this arrangement, it is possible to make a diverging angle smaller, at which light passing through the LCD element and the microlens array and being converged on the projection lens by the field lens is diverged. Therefore, there is no need to make the projection lens have a great diameter. As a result, it is possible to provide a projection-type color LCD device having a single-panel arrangement which can be produced at lower costs.

27 Claims, 11 Drawing Sheets

FIG. 4(a) WHEN COLOR SEPARATING MEANS IS USED

FIG. 4(b) WHEN COLOR SEPARATING MEANS IS NOT USED

DIVERGING ANGLE OF LIGHT AFTER OUTGOING FROM MICROLENS

FIG.6(b)

TILT ANGLE WHICH PRINCIPAL RAYS CORRESPONDING TO COLORS R, G, AND B HAVE AFTER PASSING THROUGH MICROLENS

PROJECTION-TYPE COLOR LIQUID CRYSTAL DISPLAY DEVICE HAVING NON OVERLAPPING PIXEL IMAGES

FIELD OF THE INVENTION

The present invention relates to a projection-type color liquid crystal display (LCD) device incorporating a single LCD element for color display, which is particularly applicable to a compact projection-type color liquid crystal television system and a compact information display system.

BACKGROUND OF THE INVENTION

A projection-type color LCD device, though appending light sources to it is required since an LCD element does not emit light itself, has excellent characteristics such as having a wider color reproduction range, being compact and light, and not necessitating convergence adjustment, in comparison with projection-type cathode ray tube display devices. Therefore, further development of the projection-type color LCD devices is earnestly expected.

As projection-type color image display arrangements with the use of LCD elements, there are a triple-panel arrangement whereby three LCD elements are used so as to correspond to the three primary colors respectively, and a single-panel arrangement whereby a single LCD element is used. According to the former arrangement, an optical system for separating white light into color lights of the three primary colors, that is, red, green, and blue (hereinafter referred to as R, G, and B, respectively), and LCD elements for controlling the color lights so as to form images are independently provided. By optically overlapping the respective images of the colors, full color display is carried out. Since the light emitted from the white light source is efficiently utilized by this arrangement, a project-type color LCD device having high brightness can be realized. However, its optical system is complicated with a great number of parts, and hence it usually has a disadvantage in respect to cost and size in comparison with the single-panel arrangement, which is described below.

According to the single-panel arrangement, images of an LCD element having a three-primary-color filter having, for example, a mosaic pattern or a stripe pattern are projected by a projection optical system. An example of this arrangement is disclosed in the Japanese Publication for Laid-Open Patent Application No. 59-230383/1984 (Tokukaisho No. 59-230383). Since this arrangement has only one LCD element and an optical system simpler than that of the three-panel arrangement, it is suitable for a compact projection-type system which is produced at lower costs.

However, whereas the above-described arrangement has excellent features such as being produced at lower costs and being compact, it has a defect in that projected images tend to be dark, due to a decrease of utilized light which is caused by the color filter absorbing or reflecting the light. The utilized light is decreased in the single-panel arrangement to about one third of that of the three-panel arrangement using a light source having the same brightness.

To make the light source brighter can be thought of as an easy way to resolve the defect. However, there are still respective problems, in the case where the color filter is a light absorbing type and in the case where it is a light reflecting type composed of a dielectric mirror.

To be more specific, in the case where the color filter of the light absorbing type is used, light energy absorbed in the color filter turns into heat. Therefore, when the light source is made too bright, a temperature of the color filter rises, thereby not only causing a temperature rise of the LCD element but also causing discoloration of the color filter. Besides, how products of photochemical reaction of the color filter influence on liquid crystal is not completely elucidated, and it is anticipated that display defects due to the products may occur in the future, which leads to low reliability.

In the case where the latter light reflecting type, that is, the color filter composed of the dielectric mirror is used, the above problem of heat caused by making the light source brighter and the subsequent problem of discoloration are avoidable. However, since the dielectric mirror is patterned at a fine pitch, production costs remarkably rise. Thus, it is failed to achieve the advantage of the single-panel arrangement, that is, being produced at lower costs.

Figure 12:
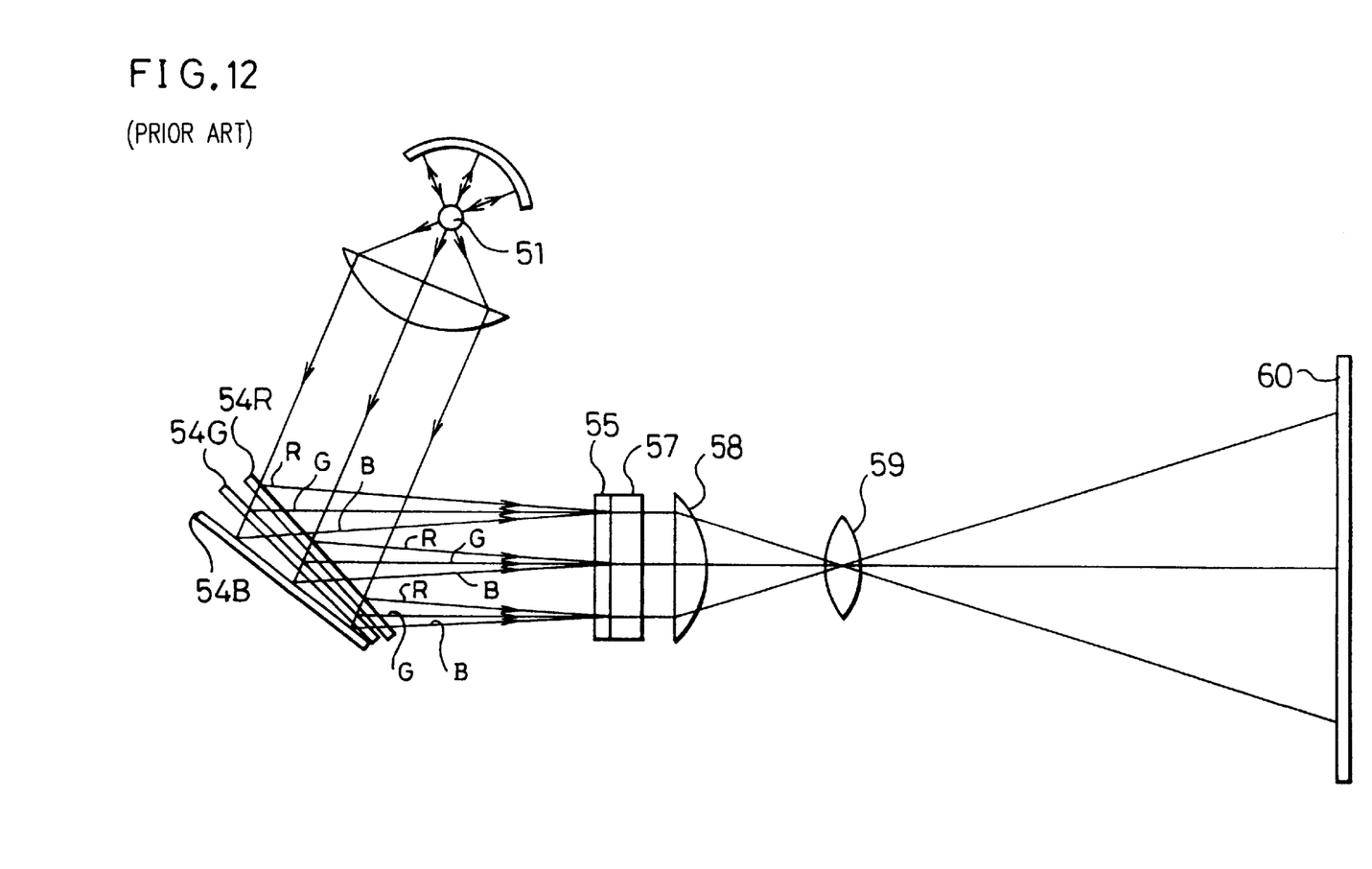
FIG. 12 is a view illustrating a schematic arrangement of a conventional projection-type color LCD device.

As a single-panel-type color LCD device wherein the brightness of projected images is improved, the Japanese Publication for Laid-Open Patent Application No. 4-60538/1992 (Tokukaihei No. 4-60538) discloses a device wherein dichroic mirrors 54R, 54G, and 54B are provided in a sector form, as illustrated in FIG. 12, so that white light from a white light source 51 is divided into respective light fluxes R, G, and B, for enhancing the luminous efficiency.

In this device, the light fluxes obtained by the dichroic mirrors 54R, 54G, and 54B respectively enter, at different angles, microlens array 55 provided on a light source side of an LCD element 57. The light fluxes having passed through the microlens array 55 are, in accordance with the respective different angles of incidence, respectively projected on sections of the LCD element 57. The sections of the LCD element 57 are respectively driven by signal electrodes to which corresponding color signals are independently applied. Since this device has neither the color filter of the light absorbing type nor the dielectric mirror, the luminous efficiency is improved, thereby making it possible to obtain bright images without sacrificing the advantage of the single-panel arrangement. Note that in FIG. 12, 59 represents a projection lens, and 60 represents a screen.

However, the device disclosed in the above-mentioned publication of Tokukaihei 4-60538 has a problem of lowering color purity. This problem is caused as follows: the light fluxes obtained by the separation by the dichroic mirrors are projected not on the corresponding pixels but on neighboring pixels, due to a low degree of parallelization of light in the case where a lighting means used therein has poor performance in respect to the degree of parallelization of light, aberration of the microlens, stray light caused by multiple reflection between the dichroic mirrors, or the like.

Figure 13:
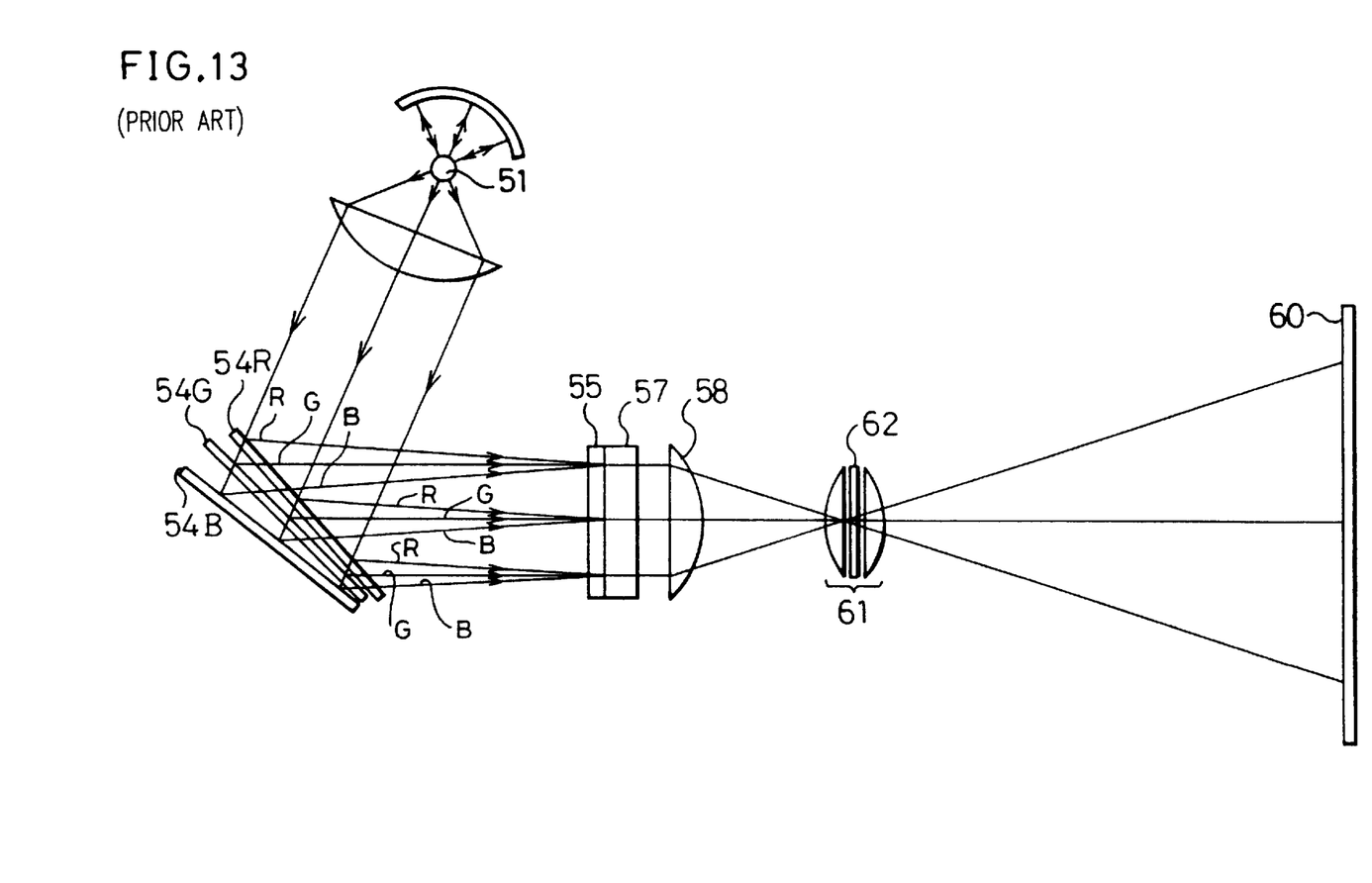
FIG. 13 is a view illustrating a schematic arrangement of another conventional projection-type color LCD device.

As an arrangement for restraining the lowering of the color purity, the Japanese Publication for Laid-Open Patent Application No. 7-181487/1995 (Tokukaihei 7-181487) discloses an arrangement wherein a color filter 62 as means for regulating wave length is provided at an entrance pupil position (pupil plane) of a projection lens 61, as shown in FIG. 13.

In a device of this arrangement, in the case where some light fluxes pass through pixels of wave length ranges which do not correspond to the wave lengths of the light fluxes, the light fluxes are blocked by the color filter 62 provided at the entrance pupil position of the projection lens 61. Therefore, even in the case where lighting means of poor performance in respect to a degree of parallelization of light is used, or even in the case aberration of the microlens or stray light due to multiple reflection between the dichroic mirrors occurs, undesired color mixture is prevented, while high-quality projected images having high color purity can be obtained.

In addition, usually the color reproduction range is determined depending on total characteristics of color separating means and color synthesizing means in the case of a device having the three-panel arrangement, whereas in the case of a device disclosed in the above publication Tokukaihei 4-60538, a color reproduction range of displayed images is virtually determined only by the dichroic mirrors as color separating means, which respectively correspond to the primary colors R, G, and B. Therefore, a satisfactory color reproduction range cannot be realized unless each of the dichroic mirrors has high wavelength selectivity, and hence the color separating means costs higher than that used in a usual projection-type color LCD device having the three-panel arrangement. But by thus providing the color filter 62 at the entrance pupil position of the projection lens 61, the problem of sensitive wavelength selectivity is solved.

Thus, in both the devices disclosed by the publications Tokukaihei No. 4-60538 and Tokukaihei No. 7-181487, brightness of projected images is improved in comparison with a device of the single-panel arrangement wherein an LCD element incorporating a color filter is used. However, both the devices have an arrangement wherein lights of the colors R, G, and B, projected on the LCD element at different angles, respectively, are converged by the microlens on respective corresponding apertures of pixels.

Figure 7:
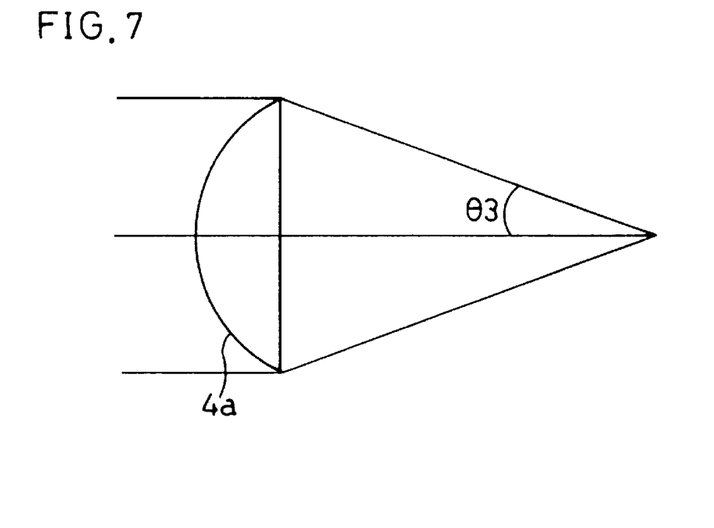
FIG. 7 is an explanatory view of a converging angle of the microlens.

Therefore, the light fluxes having passed through the LCD element are diverged at angles each of which is a sum of each angle of incidence of the light fluxes on entering the LCD element 57 and a converging angle θ3 of a microlens 4a shown in FIG. 7. To catch the diverged light, a projection lens having a great aperture is necessitated. In other words, light entering the LCD element is converged at a converging angle θ3 so as to be converged at pixel apertures, while after passing through the pixel apertures, the light is diverged at a diverging angle θ3. Since such diverging light causes a large area to be irradiated, the projection lens has to have a great diameter so as to catch all the diverging light. Therefore, costs of the projection lens become higher than the costs in the case of the device of the usual single-panel arrangement. Thus, the lowering of the production costs cannot be desirably achieved.

SUMMARY OF THE INVENTION

The object of the present invention is to provide a projection-type color LCD device having the single-panel arrangement which has such advantages as brighter projected images, a wider color reproduction range, compactness, and lower production costs.

To achieve the above-described object, the projection-type color LCD device of the present invention comprises (1) a white light source, (2) a liquid crystal display element which is illuminated by a light flux from said white light source, said liquid crystal display element having pixels grouped into pixel groups, a predetermined number, not less than 2, of the pixels constituting each pixel group, (3) a microlens array provided on one of sides of said liquid crystal display element where light is outgoing, said microlens array having microlenses corresponding to the pixel groups, respectively, (4) a projection lens for projecting light flux modulated by said liquid crystal display element, (5) a field lens, provided between said microlens array and said projection lens, for converging the light fluxes having passed through said microlens array at an entrance pupil position of said projection lens, and (6) a coloring means, provided at the entrance pupil position of the projection lens, having regions, a number of the regions being in accordance with the number of pixels constituting one pixel group.

According to the foregoing arrangement, the microlens array is provided on a side of the LCD element where light is outgoing (hereinafter referred to as light-outgoing side). Therefore, images (hereinafter referred to as microlens images) formed by the light fluxes having passed through the pixels of the LCD element, and then, the respective microlenses, are superimposed by the field lens at the entrance pupil position of the projection lens, becoming pixel enlarged images.

The microlenses are provided so as to correspond to the pixel groups each of which is composed of a predetermined number, not less than 2, of pixels of the LCD element. Therefore, in the case where, for example, three pixels corresponding to the three colors R, G, and B (color filters are not provided to the pixels) constitute one pixel group, a microlens image includes (1) three pixel images formed by light fluxes from pixels of the colors R, G, and B belonging to a corresponding pixel group, and (2) images formed by light fluxes from pixels belonging to neighboring pixel groups.

At the entrance pupil position of the projection lens, there is provided the coloring means having regions whose number corresponds to the number of pixels constituting one pixel group. The coloring means can be realized with a color filter which is arranged, for example, so as to have color regions corresponding to the colors R, G, and B so that the positions of the color regions are adjusted to the positions of the pixel enlarged images corresponding to the colors R, G, and B. With the use of such a color filter, the light fluxes projected by the projection lens are colored when passing through the color regions provided at the entrance pupil position of the projection lens, thereby forming colored projected images.

As described above, in the case of a conventional arrangement wherein the microlens array is provided on a side of the LCD element to which light is striking (hereinafter referred to as light-striking side) and light fluxes are converged to corresponding pixels by microlenses, a lens with a great diameter is required so as to catch diverged light having passed through the LCD element, which is diverged at an angle summing an angle of incidence of the light and a converging angle of the microlens. In contrast, in the case of the above-described arrangement, since the microlens array 4 is provided on a light-outgoing side of the LCD element, the converging angle of the microlens is not included in the diverging angle. Therefore, the projection lens can be made smaller (an F-number becomes higher), thereby enabling to make the system compact and to produce it at lower costs.

Furthermore, according to the aforementioned arrangement, the coloring means is separately provided from the LCD element, and a monochromic-type LCD element not incorporating a color filter is used. Therefore, even in the case where the white light source is arranged so as to have a higher brightness so that the projected images become brighter, such problems of light resistance do not occur as heat caused by the color filter absorbing light, display defects of the liquid crystal due to discoloration or products of photochemical reaction, or the like, unlike in the case of the conventional single-panel-type arrangement wherein the LCD element incorporates a color filter. As a result, necessary brightness can be obtained without difficulties.

For a fuller understanding of the nature and advantages of the invention, reference should be made to the ensuing detailed description taken in conjunction with the accompanying drawings.

DESCRIPTION OF THE PREFERRED EMBODIMENTS

First Embodiment

The following description will discuss one embodiment of the present invention.

Figure 1:
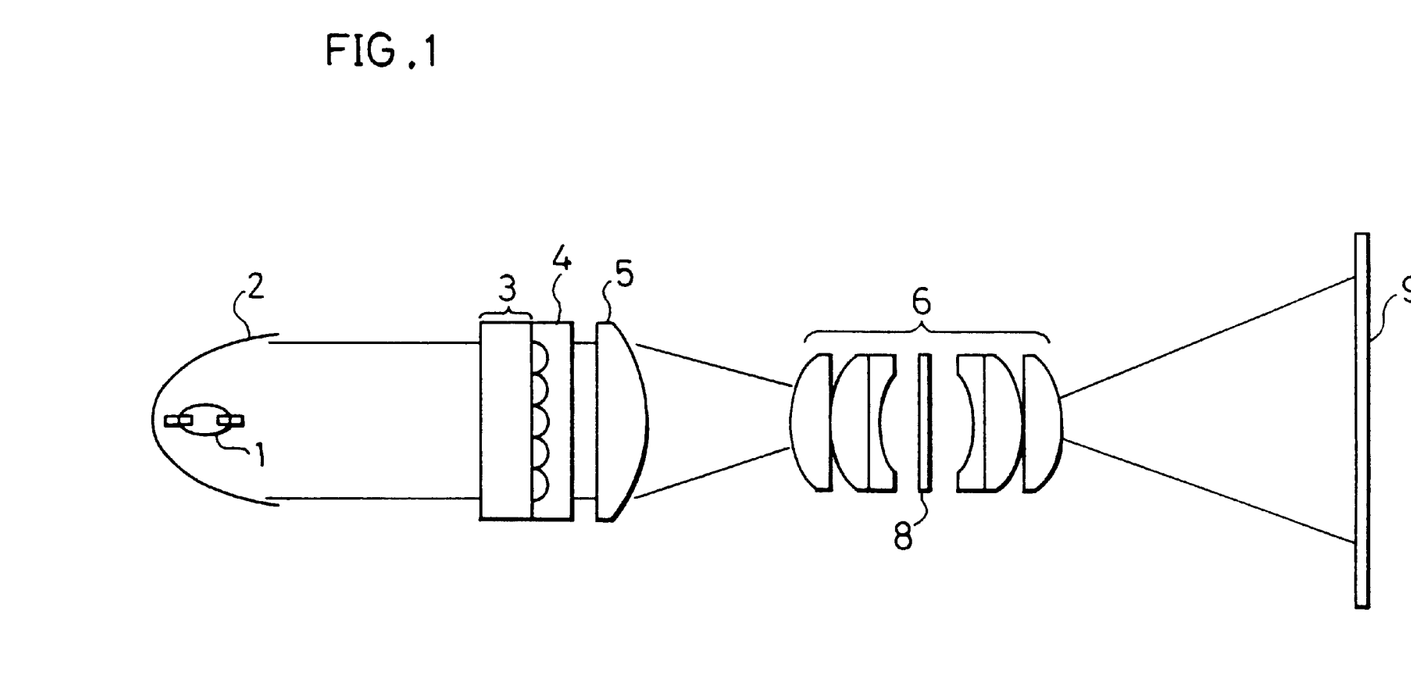
FIG. 1 is a view illustrating a schematic arrangement of a projection-type color LCD device in accordance with an embodiment of the present invention.

FIG. 1 is a schematic view illustrating an arrangement of a projection-type color LCD display device in accordance with the present embodiment. In the present embodiment, a 150 watt metal halide lamp with an arc length of 5 mm is used as a white light source 1. Other than the metal halide lamp, a tungsten halogen lamp, a xenon lamp, or the like can be used as the white light source 1.

Behind the white light source 1, there is provided a parabolic mirror 2, so that at a focal position thereof, the white light source 1 is installed. With this arrangement, light emitted from the white light source 1 is reflected by the parabolic mirror 2, thereby becoming substantially parallel light to be projected on an LCD element 3.

Figure 2A:
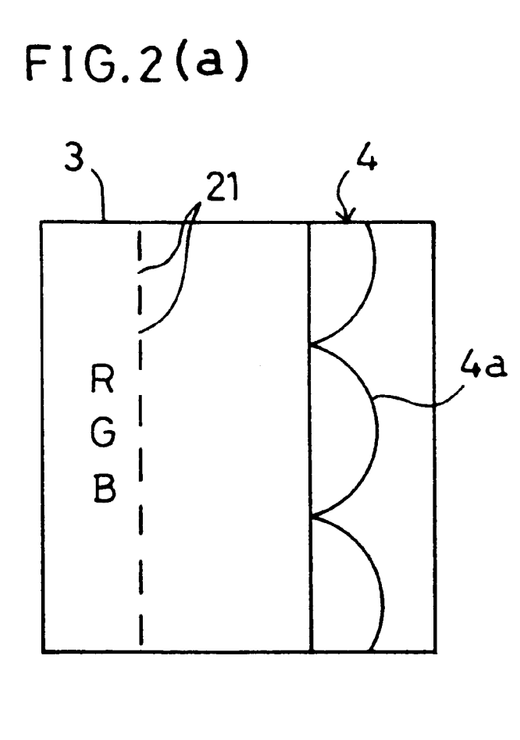
FIG. 2(a) is a cross-sectional view illustrating a correlation between positions of pixels and a microlens array which is a compound-eye type lens, in the projection-type color LCD device.
Figure 2B:
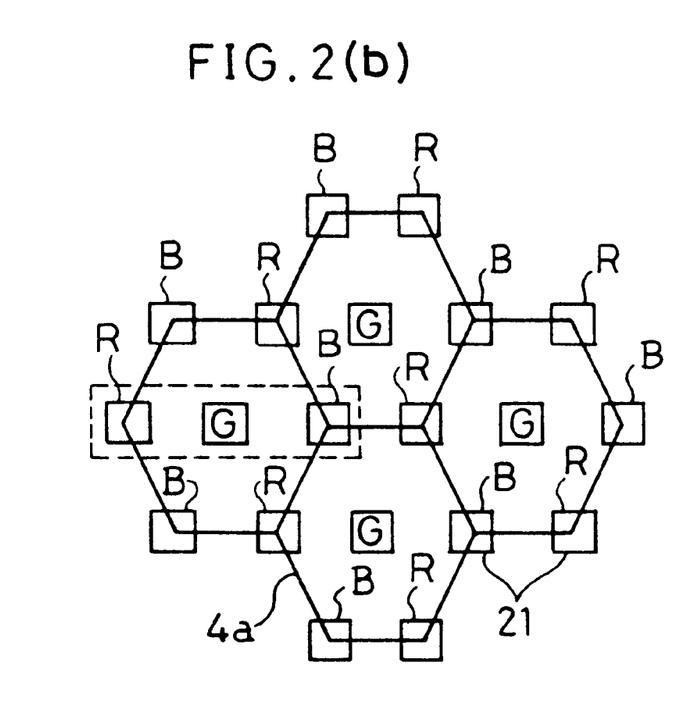
FIG. 2(b) is a front view illustrating a correlation between positions of pixels and a microlens array which is a compound-eye type lens, in the projection-type color LCD device.

As the LCD element 3, an active matrix-type LCD element having thin film transistors (TFT) for switching rectangular pixels provided in matrix is used in the present embodiment. The LCD element 3 is a monochromic type without a color filter. As shown in FIG. 2(a), each of a plurality of pixels (in the figure, apertures of the pixels are shown) 21 corresponds to any one of the colors G. R, and B, and each pixel 21 is driven by a signal corresponding to the color to which the pixel corresponds. The arrangement of the pixels 21 each corresponding to any one of the colors R, G, and B is a delta-type arrangement as illustrated in FIG. 2(b). The pixels are arranged at a pitch of 130 μm both vertically and horizontally, while each aperture of the pixels has 90 μm in both length and breadth.

On a light-outgoing side of the LCD element 3, a microlens array 4 is provided. In the present embodiment, the microlens array 4 is a compound-eye type lens having a honey-comb structure wherein spherical microlenses 4a each having a hexagonal shape are densely provided so as to be joined one another, as illustrated in FIG. 2(b). The microlens array 4 is arranged so that each microlens 4a corresponds to three pixels 21 corresponding to the three colors R, G, and B, respectively, in such a manner as shown in FIG. 2(b) wherein one microlens 4a corresponds to linearly aligned three pixels 21 encircled by a broken line. Each pixel group is composed of three pixels 21, as those encircled by the broken line thus constitutes one pixel group. In this case, a focal distance fμ of the microlens array 4 is 720 μm (which is equivalent to 1.1 mm in a glass substrate, 1.1 mm being a thickness of the TFT substrate of the LCD element 3).

As a method for manufacturing the microlens array 4, any one of the following can be used: the ion exchange method (see Appl. Opt. Vol.21, p.1052 (1984), or Electron. Lett. Vol.17, p.452 (1981)); the swelling method (see Suzuki et al., "New Manufacturing Method of Plastic Microlens", 24th meeting of the Japan Society of Micro-optics); hot melt method (see Zoran D. Popovic et al., "Technique for Monolithic Fabrication of Microlens Arrays", Appl. Opt. Vol.27, p.1281 (1988)); the vapor deposition method (see the Japanese Publication for Laid-Open Patent Application No. 55-135808/1980 (Tokukaisho No. 55-135808)); the thermal transcription method (see the Japanese Publication for Laid-Open Patent Application No. 61-64158/1986 (Tokukaisho 61-64158)); the machining method; and a method disclosed in the Japanese Publication for Laid-Open Patent Application No. 3-248125/1991 (Tokukaihei No. 3-248125).

On the light-outgoing side of the microlens array 4, there are provided a field lens 5 and a projection lens 6 in this order, as illustrated in FIG. 1. The field lens 5 has a function of converging the light fluxes having passed through the respective microlenses 4a of the microlens array 4, at the entrance pupil position of the projection lens 6. The field lens 5 has a focal distance fγ of 145 mm.

The projection lens 6 is for projecting the light fluxes converged by the field lens 5 onto a screen 9 provided in front of the projection lens 6. The projection lens 6 is arranged so as to have a pupil diameter as described below.

Figure 3:
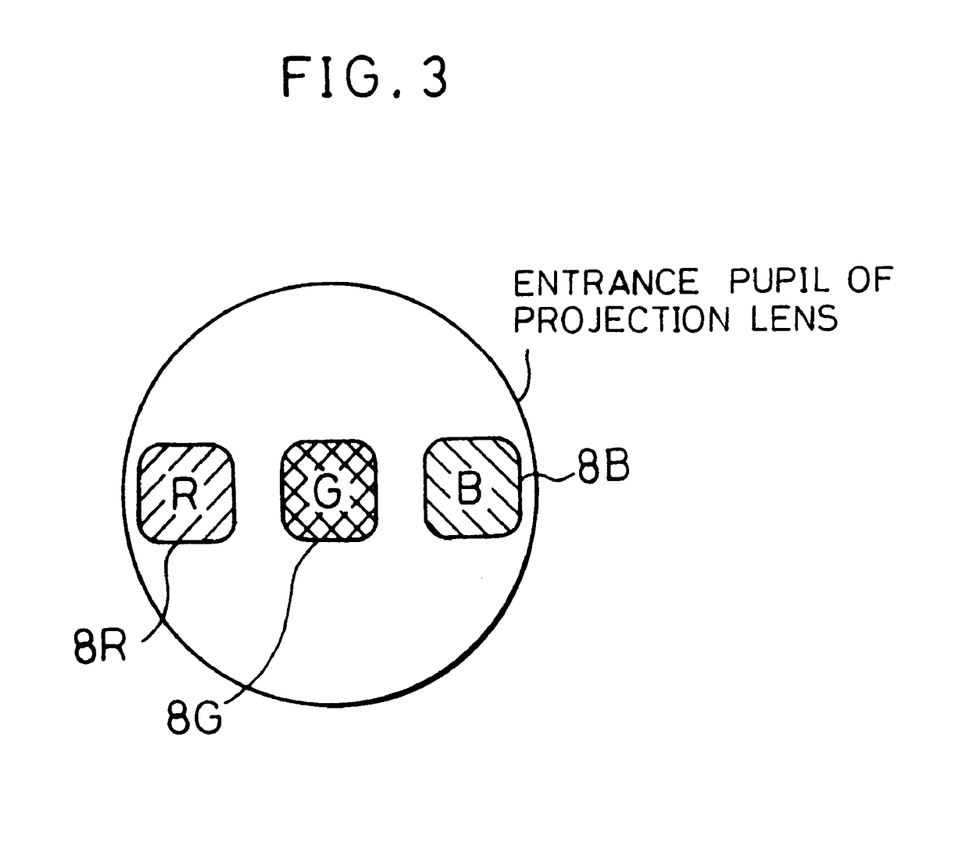
FIG. 3 is a front view of a color filter provided at an entrance pupil position of a projection lens provided in the projection-type color LCD device.

A color filter 8 as coloring means is provided at the entrance pupil position of the projection lens 6. In the present embodiment, used as the color filter 8 is an interference color filter composed of a dielectric mirror which reflects light whose wave length does not fall in a wave length range for transmitted wave. In the color filter 8, three color regions 8R, 8G, and 8B are provided so as to correspond to the colors R, G, and B, respectively, as illustrated in FIG. 3. The color regions 8R, 8B, and 8G are arranged so as to pass visible light having a wave length of not less than 600 nm, visible light having a wave length of not more than 500 nm, and visible light having a wave length of 500 nm to 570 nm, respectively. Positions of the color regions 8R, 8G, and 8B will be described later.

The white light emitted from the white light source 1 and projected on the LCD element 3 passes a plurality of pixels 21 of the LCD element 3 respectively corresponding to the colors R, G, and B, and thereafter, enters the microlens array 4, thereby being converted into substantially parallel light which has a diverging angle θ1 with respect to a principal ray α as center. The principal ray α is a ray passing through the center of the pixel aperture and the center of the microlens 4a, while the diverging angle θ1 is an angle between the principal ray α and a ray β which passes through an edge of the pixel aperture and the center of the microlens 4a.

Images formed by light fluxes which, after having passed through the pixels 21 of the LCD element 3, have passed through the microlenses 4a (hereinafter these images are referred to as images of microlenses 4a) are superimposed at the entrance pupil position by the field lens 5, thereby forming pixel enlarged images.

The microlenses 4a are provided so as to correspond to the pixel groups composed of the three pixels 21 of the LCD element 3, the three pixels corresponding to the three colors R, G, and B, respectively (pixels 21 corresponding the colors R, G, and B are hereinafter referred to as pixels 21R, pixels 21G, and pixels 21B, respectively). Therefore, each of the images of microlenses 4a includes (1) three pixel images which are formed by light fluxes from pixels 21R, 21G, and 21B belonging to a corresponding pixel group, and (2) pixel images which are formed by light fluxes from pixels belonging to a neighboring pixel groups.

Figure 4A:
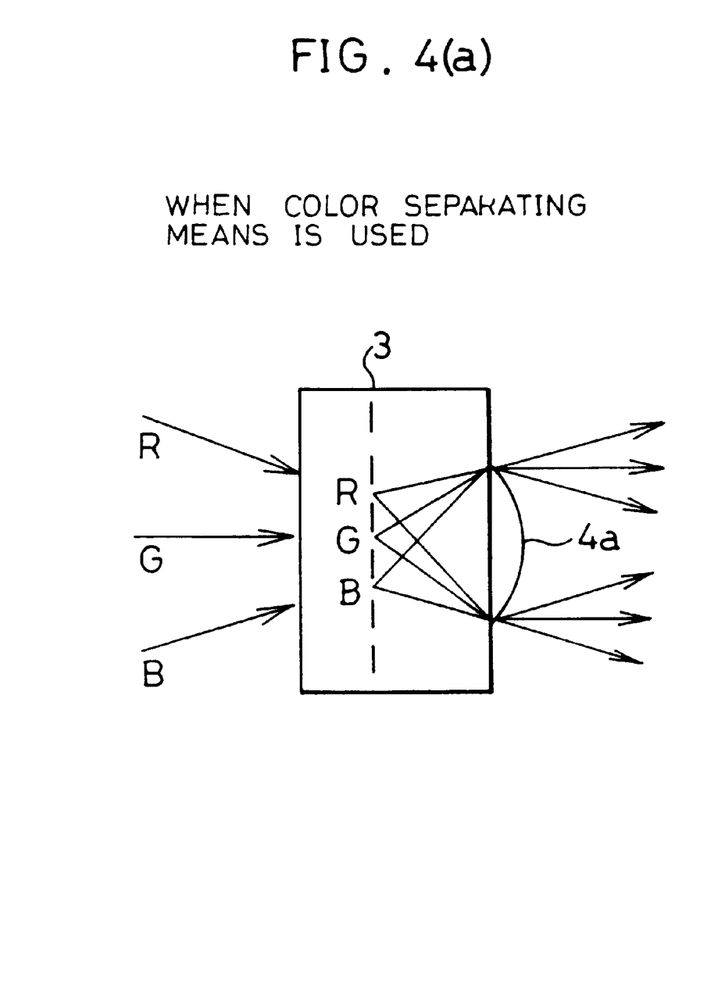
FIG. 4(a) is a view illustrating a state of incidence of light to a microlens in the case where color separating means is used.
Figure 4B:
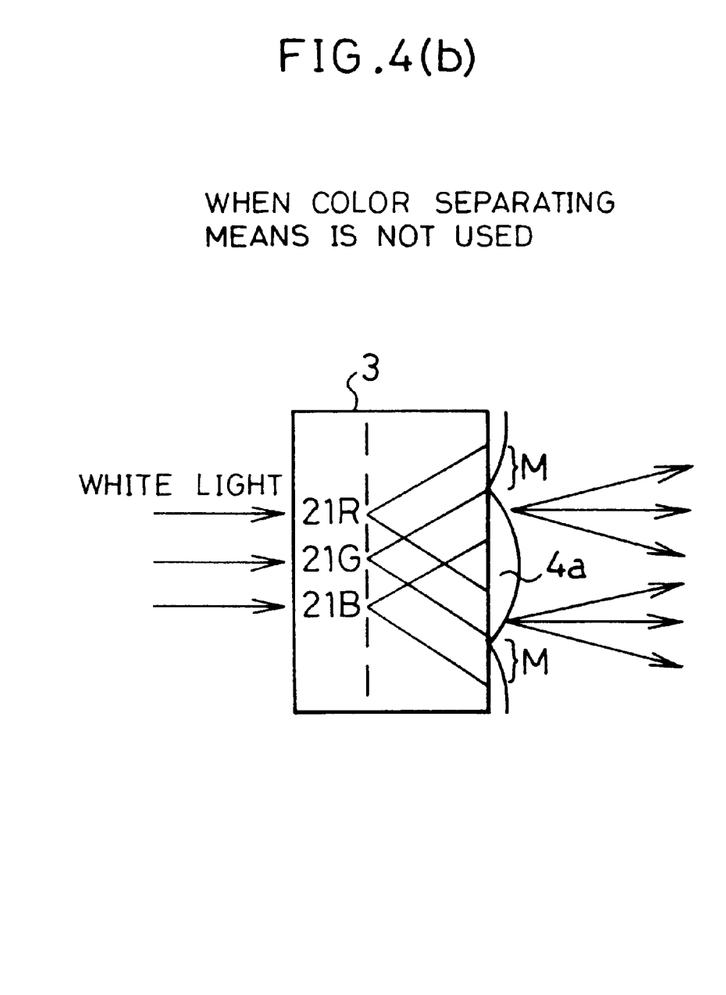
FIG. 4(b) is a view illustrating a state of incidence of light to a microlens in the case where the color separating means is not used.

This is because, as illustrated in FIG. 4(b), light fluxes having entered pixels belonging to one pixel group in the LCD element 3 partly enter a corresponding microlens 4a while partly enter a neighboring microlens 4a, like a light flux indicated by M in FIG. 4(b).

Further, a magnifying ratio W of an enlarged image obtained by superimposing the images of microlenses 4a at the entrance pupil position of the projection lens 6 is found by the following formula (1):

$$W = f\gamma/f\mu \quad (1)$$

where $f\mu$ represents the focal distance of the microlens 4a while $f\gamma$ represents a focal distance of the field lens 5.

Figure 5:
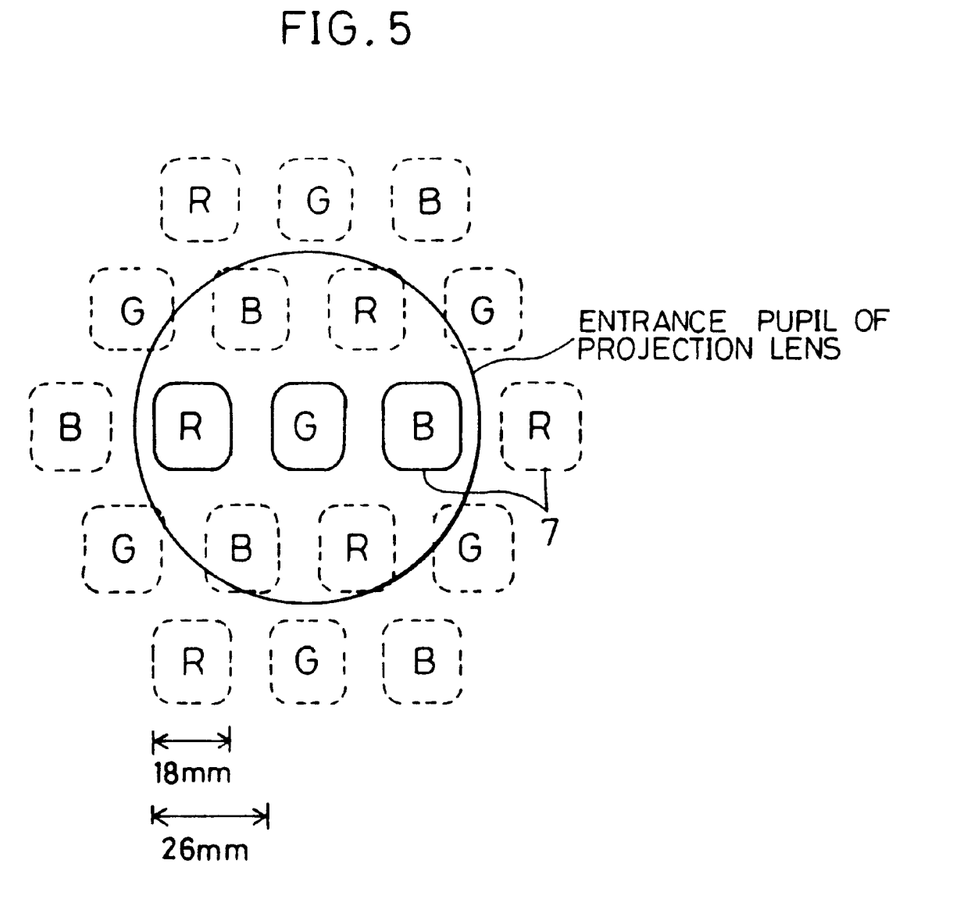
FIG. 5 is a view illustrating pixel enlarged images at the entrance pupil position of the projection lens provided in the projection-type color LCD device in accordance with the first embodiment.

Therefore, in the present embodiment wherein the microlens array 4 is a compound-eye type lens, a plurality of pixel enlarged images 7 each of which is analogous to the pixel 21 are formed, as shown in FIG. 5. In FIG. 5, three pixel enlarged images 7 drawn with solid lines in the center which correspond to the three colors R, G, and B are the pixel images formed by the light fluxes from the pixels 21R, 21G, and 21B belonging to the corresponding pixel group, among the above-described images of the pixels 21 formed by superimposing images of the light fluxes passing through the microlenses 4a. The other pixel enlarged images 7 drawn with broken lines are pixel images formed by superimposing images of light fluxes from pixels belonging to other neighboring pixel groups.

Here, since the focal distance $f\mu$ of the microlens array 4 is 720 μm while the focal distance $f\gamma$ of the field lens 5 is 145 mm, the magnifying ratio W is found as:

$$W = f\gamma/f\mu = (145/0.72) \approx 200$$

Accordingly, since the pixels 21 are provided at a pitch of 130 μm horizontally and vertically and the pixel aperture is 90 μm in both length and breadth, the pixel enlarged images 7 are provided at a pitch of 26 mm and each is 18 mm in length and breadth when they are projected at the entrance pupil position of the projection lens 6.

Therefore, in the present embodiment, the projection lens 6 is arranged so as to have a pupil diameter such that the entrance pupil covers the three pixel enlarged images 7, drawn with the solid lines, corresponding to the colors R, G, and B respectively. Positions of the three color regions 8R, 8G, and 8B of the color filter 8 are adjusted to the positions of the three pixel enlarged images 7 corresponding to the colors R, G, and B which are drawn in solid lines.

In the above-described arrangement, light emitted from the white light source 1 to the LCD element 3 passes the pixels 21R, 21G, and 21B of the LCD element 3. When the light passes the pixels 21, the pixels 21R, 21G, and 21B are driven by a signal corresponding to the color R, a signal corresponding to the color G, and a signal corresponding to the color B, respectively. By doing so, the intensity of the light passing therethrough is modulated. The light thus modulated passes through the microlens array 4 and the field lens 5, and is converged at the entrance pupil position of the projection lens 6. The light is projected on the screen 9 by the projection lens 6. Here, the light fluxes having passed through the pixels 21R pass through the color region 8R of the color filter 8, thereby becoming colored with the color R. Likewise, the light fluxes having passed through the pixels 21G pass through the color region 8G of the color filter 8, thereby becoming colored with the color G, and the light fluxes having passed through the pixels 21B pass through the color region 8B of the color filter 8, thereby becoming colored with the color B. As a result, a color image can be obtained on the screen 9.

The color reproduction range of the projection-type color LCD device thus arranged was compared with a color reproduction range of a conventional projection-type color LCD device having the single-panel arrangement (see a Tokukaihei No. 7-181487) shown in FIG. 13. As a result, it was found that the former range was equal to or wider than the latter.

Figure 6A:
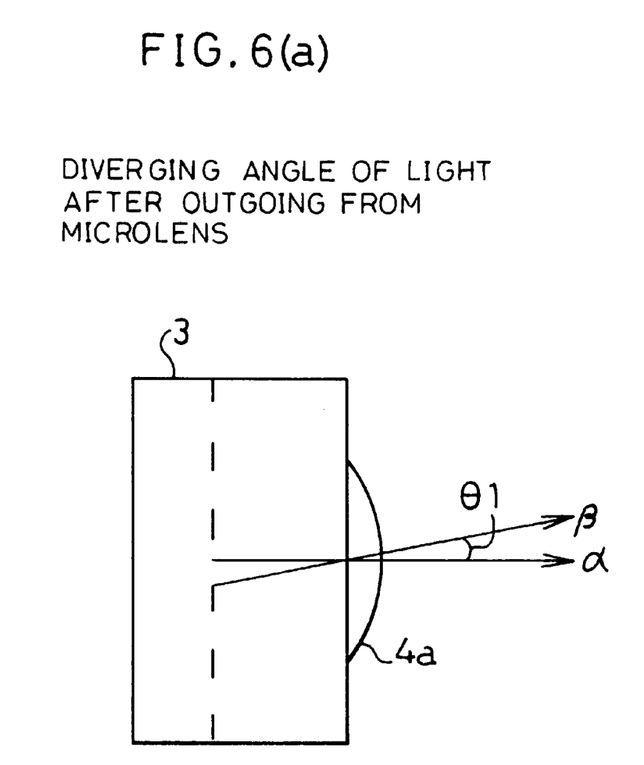
FIG. 6(a) is an explanatory view of a diverging angle of light at a pixel aperture, illustrating an angle at which light is diverged after passing the microlens.
Figure 6B:
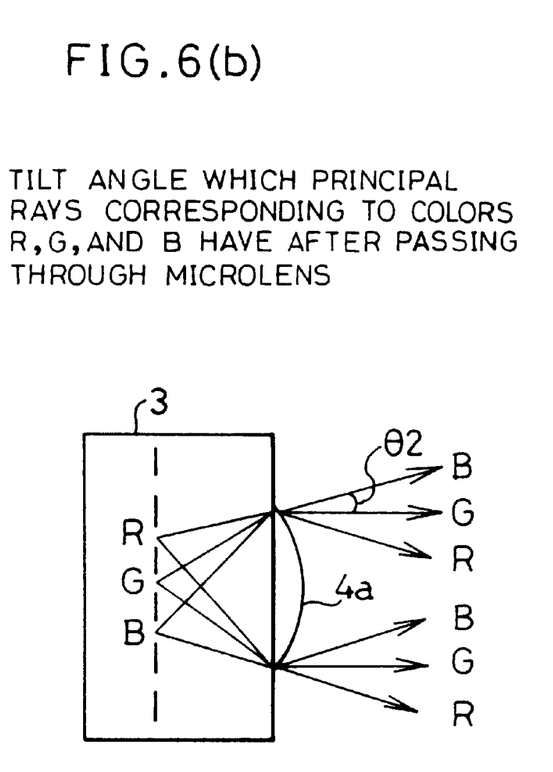
FIG. 6(b) is an explanatory view of a tilt angle of principal rays of light corresponding to colors R, G, and B, illustrating an angle at which light is diverged after passing the microlens.

Incidentally, in the case of the conventional projection-type color LCD device shown in FIG. 13, wherein since the microlens array 55 is provided on a light-striking side of the LCD element 57, a lens with a great diameter is required so as to catch diverged light which is diverged at an angle summing the angle θ1 described earlier (see FIG. 6(a)), a tilt angle θ2 of the principal rays corresponding to the colors R, G, and B having passed through the microlens 4a shown in FIG. 6(b), and a converging angle θ3 of the microlens 4a shown in FIG. 7.

In other words, the light fluxes entering the LCD element 57 are converged by the microlenses 4a at a converging angle θ3 so as to be converged to the pixels 21. Here, the incident light is diverged at a diverging angle θ3 after passing through the pixels 21. In order to catch such all the diverging light the projection lens 61 has to have a great diameter.

In contrast, in the case of the projection-type color LCD device of the present embodiment, since the microlens array 4 is provided on the light-outgoing side of the LCD element 3, a diverging angle of light to enter the projection lens 6 is not more than (θ1+θ2). Therefore, the projection lens 6 can be made smaller, thereby enabling to make the system compact and to produce it at lower costs.

In this arrangement, the colors R, G, and B are separated with the use of the color filter 8, which is provided at the entrance pupil position of the projection lens 6, while the LCD element 3 is a monochromic LCD element not incorporating a color filter. Therefore, even in the case where the white light source 1 is arranged so as to have a higher brightness so that the projected images become brighter, there do not occur such problems of light resistance as heat caused by the color filter absorbing light, display defects of the liquid crystal due to fading or products of photochemical reaction, or the like, unlike in the case of the conventional arrangement wherein the LCD element incorporating a color filter. Thus, necessary brightness can be obtained without problems.

Note that in the case of the conventional projection-type color LCD device illustrated in FIG. 13, the microlens array 55 is provided on the light-striking side of the LCD element 57 so that the light fluxes are converged to pixel apertures of the LCD element 57 by the respective microlenses. Therefore, at the entrance pupil position of the projection lens 61, three images having the three primary colors, respectively, are formed by the field lens 58, and the distribution of the three images corresponds to angle distribution of rays having passed through both the pixel apertures of the LCD element 57 and the microlens array 55 (the angle distribution is substantially equal to light receiving angle distribution of the microlenses). Here, the three images partly overlap each other even though the microlenses have no aberration. Therefore, it is possible to restrain the lowering of the color purity by providing a color filter 62 matching the images, but in the case where only the color filter 62 is provided while the dichroic mirrors 54R, 54G, and 54B are not provided, a satisfactory color purity for practical application cannot be obtained.

To be more specific, since the images corresponding to the three primary colors (light having passed through the pixel apertures of the LCD element 57) are diverged at a diverging angle $\theta 3$ as described above, the images have larger areas when they are projected at a greater distance from the pixel apertures, thereby partly overlapping each other. Thus, the problem described above occurs.

In contrast, in the arrangement of the projection-type color LCD device of the present embodiment, since the microlens array 4 is provided on the light-outgoing side of the LCD element 3, the pixel enlarged images 7 corresponding to the colors R, G, and B are formed at the entrance pupil position of the projection lens 6 by the field lens 5. These images do not overlap but are completely separate from each other in the case where the microlenses 4a do not have aberration. More specifically, since the pixel enlarged images 7 (formed by the light fluxes having passed through the pixel apertures of the LCD element 3) corresponding to the colors R, G, and B, respectively, are analogous to the corresponding pixels of the LCD element 3, the pixel enlarged images 7 by no means overlap each other. Therefore, by providing the color regions 8R, 8G, and 8B of the color filter 8 so that they are adjusted to the pixel enlarged images 7, a full color image having a satisfactory color purity for practical application can be displayed.

Besides, in the present embodiment, since the dielectric mirror which reflects light whose wave length does not fall in a wave length range for transmitted wave is used as the color filter 8, heat emitting and discoloration of the color filter itself are avoidable, thereby ensuring more liability. In addition, since the patterning at a fine pitch is not required in this case, unlike in the case of the color filter installed in the conventional LCD element, the advantage of being provided at lower costs which is achieved by the single-panel arrangement is not sacrificed at all.

Note that as the color filter 8, an absorbing-type color filter may be used instead, such as a dye color filter, or a pigment-diverged color filter.

Furthermore, in the projection-type color LCD device of the present embodiment, the pupil diameter of the projection lens 6 is adjusted so that the three pixel enlarged images 7 corresponding to the colors R, G, and B, drawn with the solid lines in FIG. 3, fall within the entrance pupil of the projection lens 6. However, the light can be more efficiently used, by arranging as follows: the projection lens 6 is arranged so as to also catch neighboring pixel enlarged images 7 which are drawn with the broken lines in the figure, and more color regions 8R, 8G, and 8B are provided in the color filter 8 so that they are adjusted to the positions of the neighboring pixel enlarged images. By doing so, further brighter projected images can be obtained.

Second Embodiment

The following description will discuss another embodiment of the present invention. The members having the same structure (function) as those in the above-mentioned embodiment will be designated by the same reference numerals and their description will be omitted.

Figure 8:
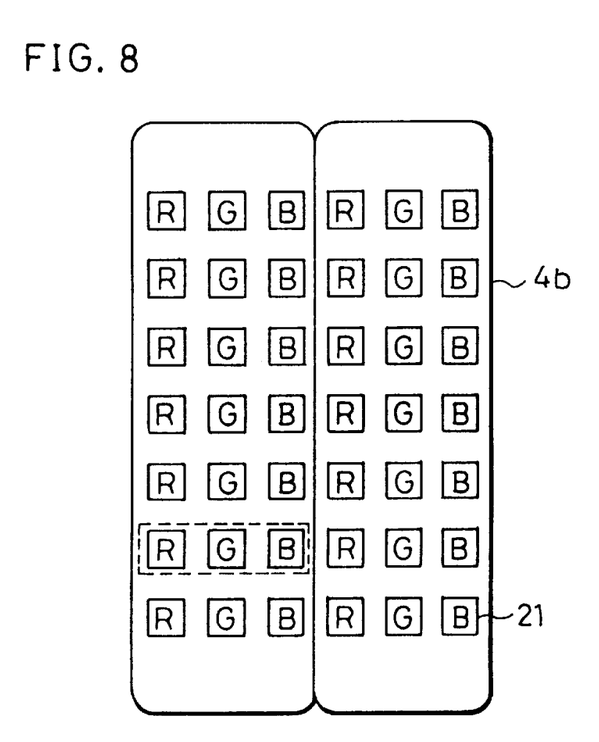
FIG. 8 is an explanatory view illustrating a correlation between positions of pixels and a microlens array which is a lenticular lens, in a projection-type color LCD device in accordance with another embodiment of the present invention.

A projection-type color LCD device of the present embodiment has the same optical system as that in the projection-type color LCD device of the first embodiment. Note that the LCD element wherein the pixels are arranged in the delta form is used in the first embodiment, while an LCD element as shown in FIG. 8, wherein the pixels are arranged in a stripe form, is used in the present embodiment. Therefore, as the microlens array 4, a lenticular lens is used in the present embodiment.

Microlenses 4b each of which has a cross section in a segment shape constitute the lenticular lens. As illustrated in FIG. 8, each microlens 4b has a light converging function only in a direction (horizontal in the figure) orthogonal to a direction (vertical in the figure) in which pixel groups (one of them is indicated by a broken line in the figure) are arranged, each pixel group having horizontally-lined three pixels 21 which correspond to the three colors R, G, and B, respectively (hereinafter referred to as pixels 21R, 21G, and 21B).

Thus, the pixel groups each of which is composed of horizontally-lined three pixels 21R, 21G, and 21B are provided vertically, and positions of the pixels 21 and the microlens array 4 are adjusted so that one microlens 4b corresponds to one vertical line of the pixel groups.

Figure 9:
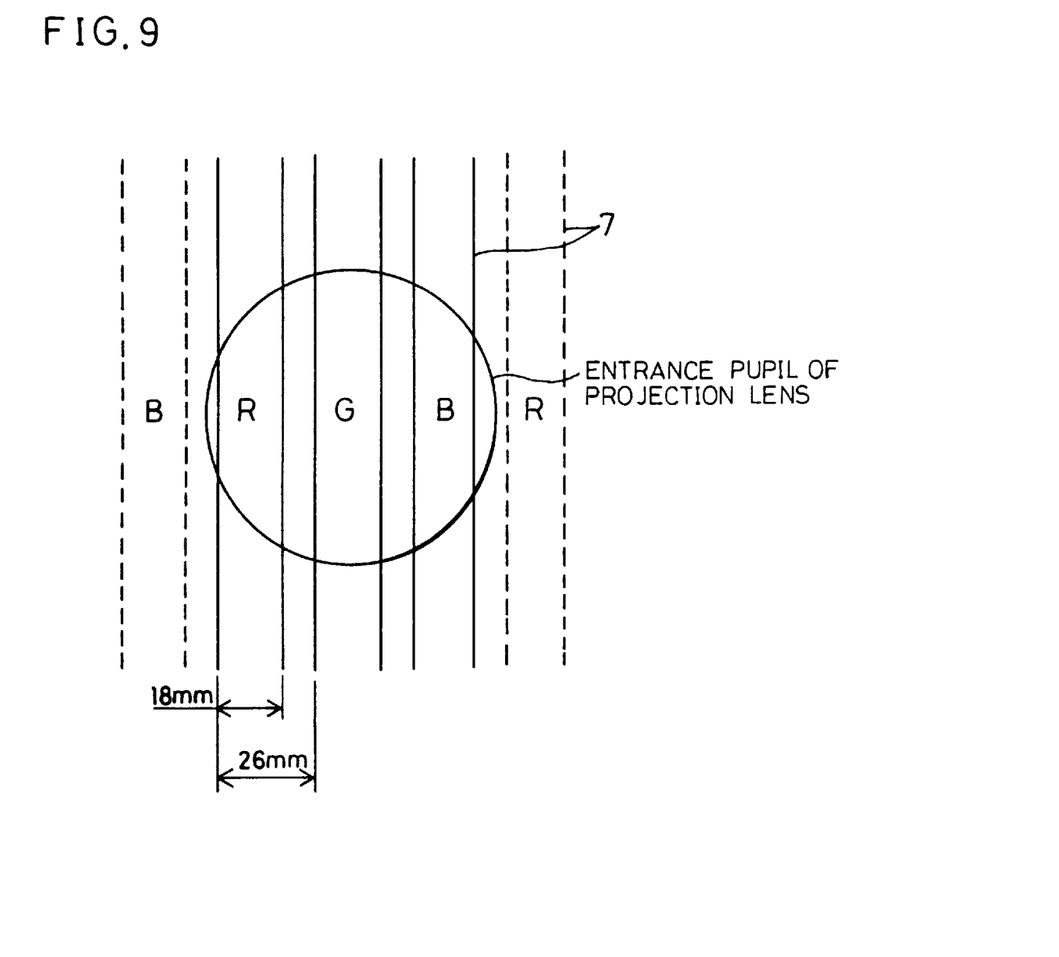
FIG. 9 is a view illustrating pixel enlarged images at an entrance pupil position of a projection lens provided in the projection-type color LCD device.

In this case, at the entrance pupil position of the projection lens 6, pixel enlarged images 7 corresponding to the colors R, G, and B are formed in a stripe form as if they would be obtained by stretching the pixels 21 in the vertical direction, as illustrated in FIG. 9. In this case as well, the pixel enlarged images 7 drawn with broken lines in the figure are formed by light fluxes not having entered corresponding microlenses 4b but neighboring microlenses 4b.

Like in the case of the projection-type color LCD device of the first embodiment, the projection lens 6 is arranged so as to have an entrance pupil diameter such that the entrance pupil covers the three pixel enlarged images 7 corresponding to the three colors R, G, and B, which are drawn with the solid lines in FIG. 9.

Figure 10:
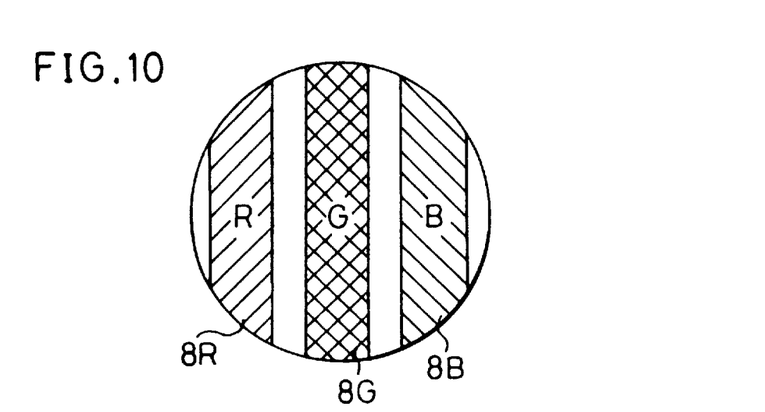
FIG. 10 is a view illustrating a color filter provided at the entrance pupil position of the projection lens provided in the projection-type color LCD device.

In addition, the color filter 8 provided at the entrance pupil position of the projection lens 6 has belt-like color regions 8R, 8G, and 8B corresponding to the three pixel enlarged images 7, respectively, as illustrated in FIG. 10.

A color reproduction range of the projection-type color LCD device thus arranged was compared with the color reproduction range of the projection-type color LCD device of the first embodiment, and it was found that the former was substantially equal to the latter.

With this arrangement of the projection-type color LCD device of the present embodiment, no color deviation occurs even though the projection lens 6 is shifted upward or downward (leftward or rightward in the case where the lenticular lens is turned through an angle of 90°) with respect to the LCD element 3. Therefore, the arrangement of the projection-type color LCD device of the present embodiment is particularly suitable for a device to which a method for shifting up and down projected images by moving the projection lens 6 upward or downward is applied.

Third Embodiment

The following description will discuss still another embodiment of the present invention. The members having the same structure (function) as those in the above-mentioned embodiment will be designated by the same reference numerals and their description will be omitted.

Figure 11:
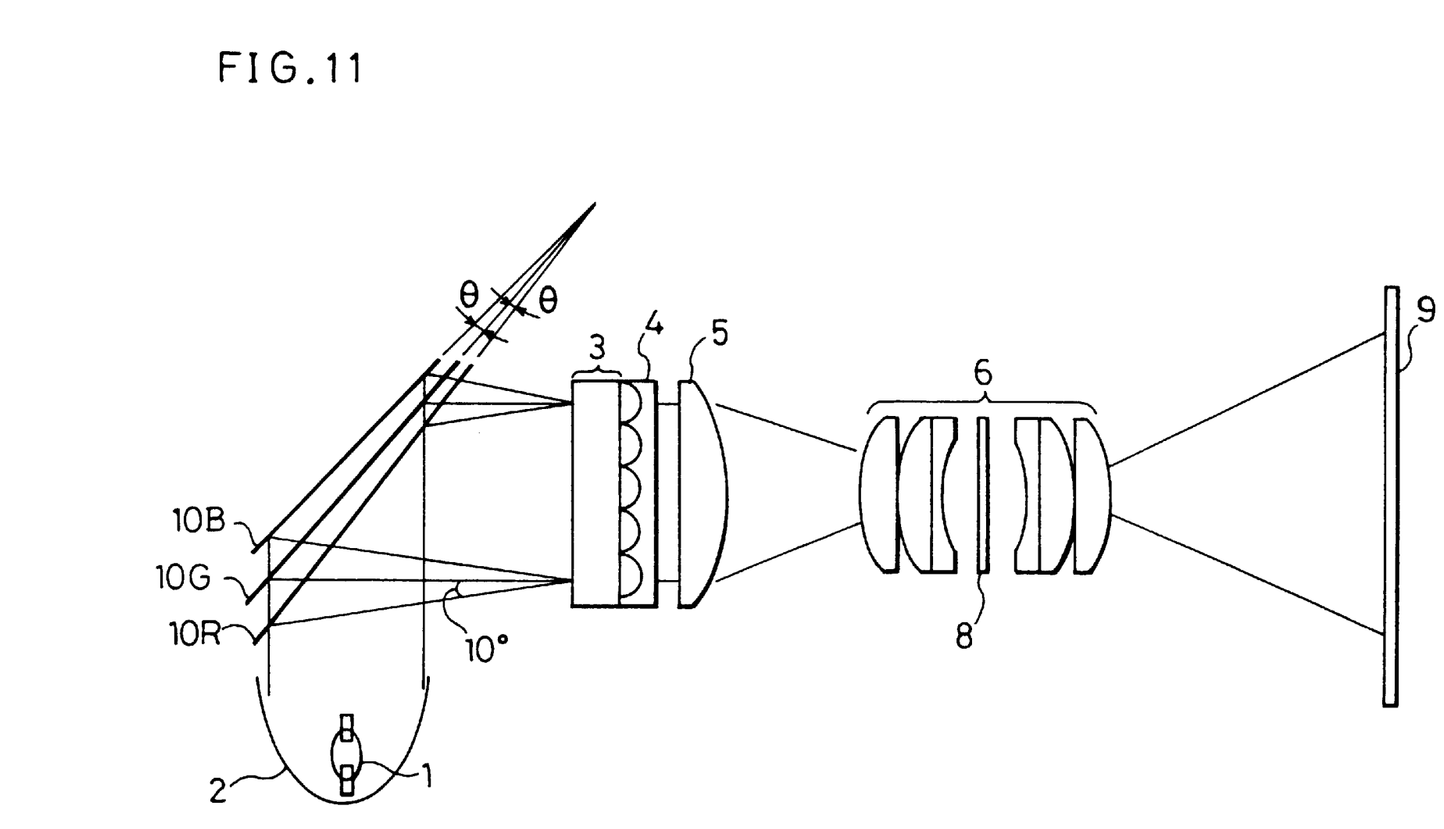
FIG. 11 is a view illustrating a schematic arrangement of a projection-type color LCD device in accordance with still another embodiment of the present invention.

FIG. 11 is a schematic view illustrating an arrangement of a projection-type color LCD device of the present embodiment. As shown in FIG. 11, the projection-type color LCD device of the present embodiment has the same arrangement as that of the first embodiment shown in FIG. 1, except that it has three dichroic mirrors 10R, 10G, and 10B as color separating means between a white light source 1 and an LCD element 3.

Light emitted from the white light source 1 is reflected by a parabolic mirror 2 provided behind, thereby being converted into a substantially parallel light flux. In front of the parabolic mirror 2, the three dichroic mirrors 10R, 10G, and 10B are provided at different angles. The dichroic mirrors, provided on an optical axis in this order, have characteristics of selectively reflecting lights having wave lengths for the colors R, G, and B, respectively, while transmitting the other lights. The dichroic mirrors 10R, 10G, and 10B are manufactured by the usual multilayer thin film coating method. It is preferable that the dichromic mirrors are arranged so as to transmit infrared ray, so that the LCD element 3 may have less temperature rises.

The dichroic mirrors 10R, 10G, and 10B are provided as follows: given a revolution axis provided in a perpendicular direction with respect to the sheet of paper of FIG. 11, the dichroic mirror 10G is revolved through an angle $\theta$ with respect to the dichroic mirror 10R, while similarly the dichroic mirror 10B is revolved through an angle $\theta$ with respect to the dichroic mirror 10G. The relative angle $\theta$ is given as:

$$\theta = \tan^{-1}(P/f\mu)/2 \quad (2)$$

where P represents a pixel pitch of the LCD element 3, while $f\mu$ represents a focal distance of the microlens array 4. Therefore, since the same LCD element 3 and the same microlens array 4 as those in the first embodiment are used, the following is found from the above formula (2):

$$\theta = \tan^{-1}(130/720)/2 \approx 5°$$

Therefore, in this case, the dichroic mirrors 10R, 10G, and 10B are arranged so that the light flux from the dichroic mirror 10G perpendicularly enters the LCD element 3, while the light fluxes from the dichroic mirrors 10R and 10B enter the same with tilts of angles of ±10°, respectively, with respect to the light flux from the dichromic mirror 10G.

By thus arranging the dichroic mirror 10R, 10G, and 10B, the light fluxes from the dichroic mirror 10R, 10G, and 10B having passed through the pixels 21 of the LCD element 3 efficiently enter a corresponding microlens 4a, as illustrated in FIG. 4(a). Thereafter, the light fluxes pass through the field lens 5, then enter the projection lens 6, forming pixel enlarged images 7 at an entrance pupil position of the projection lens 6.

In this case, since the light having passed through the pixels 21 efficiently enters the corresponding microlens 4a, most of the light is projected around a center of the entrance pupil position thereby being used to form pixel enlarged images 7 around the center of the entrance pupil position, which are drawn with solid lines in FIG. 5. Therefore, in the case where a projection lens having the same diameter as that in the first embodiment is used, a higher brightness can be achieved.

A color reproduction range of the projection-type color LCD device thus arranged was compared with the color reproduction range of the projection-type color LCD device of the first embodiment, and as a result it was found that the former was substantially equal to the latter. Moreover, it was found that with the use of the device of the present embodiment, the brightness of projected images could be improved by 20 percent, in the case where the same projection lens 6 was used.

Note that since the color purity of displayed pictures is determined by the color filter 8 provided at the entrance pupil position of the projection lens 6, the color separation of the light is not necessarily perfect, but a diffraction grating, a holographic optical element, or the like may be used instead of the above-described dichroic mirrors 10R, 10G, and 10B.

In the present embodiment a compound-eye type lens is used as the microlens array 4, but, as is the case of the second embodiment, a lenticular lens may be used in the case where an LCD element 3 having pixels provided in a stripe form is used.

In the case of the projection-type color LCD device of the present embodiment, there is no need to regulate a degree of parallelization of the incident light, unlike in the case of the device disclosed in Tokukaihei No. 4-60538, or the device disclosed in Tokukaihei No. 7-181487. Therefore, the arrangement of the present embodiment is effectively applied to a device having a compact panel wherein the degree of parallelization is low (in the case where the same light source is used, the degree drops as the panel has a smaller size).

To be more specific, in the conventional projection-type color LCD device, light fluxes respectively corresponding to the colors are converged to pixel apertures of the LCD element 57 by the microlens array 55 when entering the LCD element 57, as illustrated in FIG. 13. Therefore, in the case where the light fluxes have a low degree of parallelization, they are not properly converged on the pixel apertures, thereby resulting in low color reproduction. In contrast, in the projection-type color LCD device of the present embodiment, the separation of light so as to correspond to the colors is carried out by nothing other than the color filter 8. In this case, the color separating means is not required to be as capable of strict separation as the conventional color separating means. Therefore, there is no need to regulate the degree of parallelization of the incident light.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A projection-type color liquid crystal display device, comprising:
   a white light source;
   a liquid crystal display element which is illuminated by a light flux from said white light source, said liquid crystal display element having pixels grouped into pixel groups, a predetermined number, not less than 2, of the pixels constituting each pixel group;

a microlens array provided on a light output side of said liquid crystal display element, said microlens array having microlenses corresponding to the pixel groups, said microlens array dividing the light flux into fluxes which constitute a plurality of images respectively analogous to pixels corresponding to the number of the pixels in said pixel groups;

a projection lens for projecting light modulated by said liquid crystal display element;

a field lens, provided between said microlens array and said projection lens, for converging the light fluxes which constitute said plurality of images respectively analogous to pixels output by said microlens array at an entrance pupil position of said projection lens; and a coloring means, provided at the entrance pupil position of said projection lens, having regions adjusted to courses of the light fluxes, a number of the regions being in accordance with the number of pixels constituting one pixel group, wherein pixel enlarged images of said plurality of images respectively analogous to pixels are formed at the entrance pupil position of said projection lens without being overlapped.

2. The device as set forth in claim 1, wherein said microlens array is a compound-eye type lens having microlenses, the microlenses and the pixel groups having one-to-one correspondence.

3. The device as set forth in claim 1, wherein said microlens array has lenticular lenses as microlenses, each lenticular lens corresponding to a line of the pixel groups in a vertical direction or in a horizontal direction of said liquid crystal display element and having a function of converging light only in a direction orthogonal to a direction of the pixel group line.

4. The device as set forth in claim 1, wherein said coloring means is a dielectric mirror including at least one dielectric layer.

5. The device as set forth in claim 1, further comprising color separating means for:

separating the light flux from said white light source into a plurality of separate light fluxes having respective wave length ranges, a number of the separate light fluxes being in accordance with a number of the pixels constituting one pixel group; and projecting the separate light fluxes on a same region of said liquid crystal display element from different directions.

6. The device as set forth in claim 5, wherein said microlens array is a compound-eye type lens having microlenses, the microlenses and the pixel groups having one-to-one correspondence.

7. The device as set forth in claim 5, wherein said microlens array has lenticular lenses as microlenses, each lenticular lens corresponding to a line of the pixel groups in a vertical direction or in a horizontal direction of said liquid crystal display element and having a function of converging light only in a direction orthogonal to a direction of the pixel group line.

8. The device as set forth in claim 5, wherein said coloring means is a dielectric mirror including at least one dielectric layer.

9. The device as set forth in claim 5, wherein said color separating means comprises dichroic mirrors provided at different angles.

10. A projection-type color liquid crystal display device, comprising:

a liquid crystal display element having pixels grouped into pixel groups, a predetermined number of the pixels constituting each pixel group;

a microlens array provided on a light output side of said liquid crystal display element, said microlens array comprising microlenses disposed so as to correspond to the respective pixel groups;

a lens group for projecting light output by said liquid crystal display element; and coloring means for coloring the light output by said liquid crystal display element, wherein said microlens array divides light flux from said liquid crystal display element into fluxes which constitute images respectively analogous to pixels corresponding to the number of the pixels in said pixel groups, said lens group includes a light-converging lens system for focusing, as enlarged and non-overlapping images of the predetermined number of pixels, the light fluxes which constitute said plurality of image respectively analogous to pixels at an entrance pixel position of said lens group, and said coloring means, provided at the entrance pupil position of said lens group, colors the fluxes focused by said microlens, said coloring means being divided spatially according to the number of the pixels constituting said pixel groups.

11. The device as set forth in claim 10, wherein said microlens array is a compound-eye type lens having microlenses, the microlenses and the pixel groups having one-to-one correspondence.

12. The device as set forth in claim 10, wherein said microlens array has lenticular lenses as microlenses, each lenticular lens corresponding to a line of the pixel groups in a vertical direction or in a horizontal direction of said liquid crystal display element and having a function of converging light only in a direction orthogonal to a direction of the pixel group line.

13. The device as set forth in claim 10, wherein said coloring means is a dielectric mirror including at least one dielectric layer.

14. The device as set forth in claim 10, further comprising color separating means for:

separating the light flux from said white light source into a plurality of separate light fluxes having respective wave length ranges, a number of the separate light fluxes being in accordance with a number of the pixels constituting one pixel group; and projecting the separate light fluxes on a same region of said liquid crystal display element from different directions.

15. The device as set forth in claim 14, wherein said microlens array is a compound-eye type lens having microlenses, the microlenses and the pixel groups having one-to-one correspondence.

16. The device as set forth in claim 14, wherein said microlens array has lenticular lenses as microlenses, each lenticular lens corresponding to a line of the pixel groups in a vertical direction or in a horizontal direction of said liquid crystal display element and having a function of converging light only in a direction orthogonal to a direction of the pixel group line.

17. The device as set forth in claim 14, wherein said coloring means comprises is a dielectric mirror including at least one dielectric layer.

18. The device as set forth in claim 14, wherein said color separating means comprises dichroic mirrors provided at different angles.

19. A projection-type color liquid crystal display device, comprising:

a liquid crystal display element for modulating light supplied to an input side thereof, said liquid crystal display element comprising pixels organized into pixel groups each comprising first through nth pixels, n being an integer greater than or equal to 2;

an array of microlenses arranged on an output side of said liquid crystal display element, each microlens corresponding to a respective one of said pixel groups and said array of microlenses dividing light flux from said liquid crystal display element such that each microlens outputs an image which includes first through nth images respectively analogous to the pixels of the corresponding pixel group;

a converging lens for forming first through nth non-overlapping images at a focal point thereof from the images output by said microlenses, each of the first through nth non-overlapping images being a superposition of the corresponding ones of the first through nth images output by said microlenses; and a filter arranged at the focal point of said converging lens and having regions for filtering respective wavelengths, each non-overlapping image being filtered by a corresponding region of said filter.

20. The device as set forth in claim 19, wherein each pixel group consists of pixels of different colors.

21. The device as set forth in claim 19, wherein said pixels are arranged in a delta-type arrangement.

22. The device as set forth in claim 19, wherein said pixels are arranged in stripes.

23. The device as set forth in claim 19, wherein the pixels of said pixel groups are linearly aligned.

24. The device as set forth in claim 19, wherein said color filter comprises an absorbing-type color filter.

25. The device as set forth in claim 19, wherein said color filter comprises an interference color filter.

26. A projection-type color liquid crystal display device, comprising:

a liquid crystal display element for modulating light supplied to an input side thereof, said liquid crystal display element comprising pixels organized into pixel groups each comprising pixels for respective colors;

an array of microlenses arranged on an output side, but not on the input side, of said liquid crystal display element, each microlens corresponding to a respective one of said pixel groups and each microlens outputting an image which includes images formed by light from the respective pixels of the corresponding pixel group; and a converging lens for forming non-overlapping images at a focal point thereof from the images output by said microlenses, each of the non-overlapping images being a superposition of corresponding ones of the images output by said microlenses.

27. The device as set forth in claim 26, further comprising:

a color filter arranged at the focal point of said converging lens and having regions for filtering respective wavelengths, each non-overlapping image being filtered by a corresponding region of said filter.

* * * * *